UNITED STATES PATENT OFFICE.

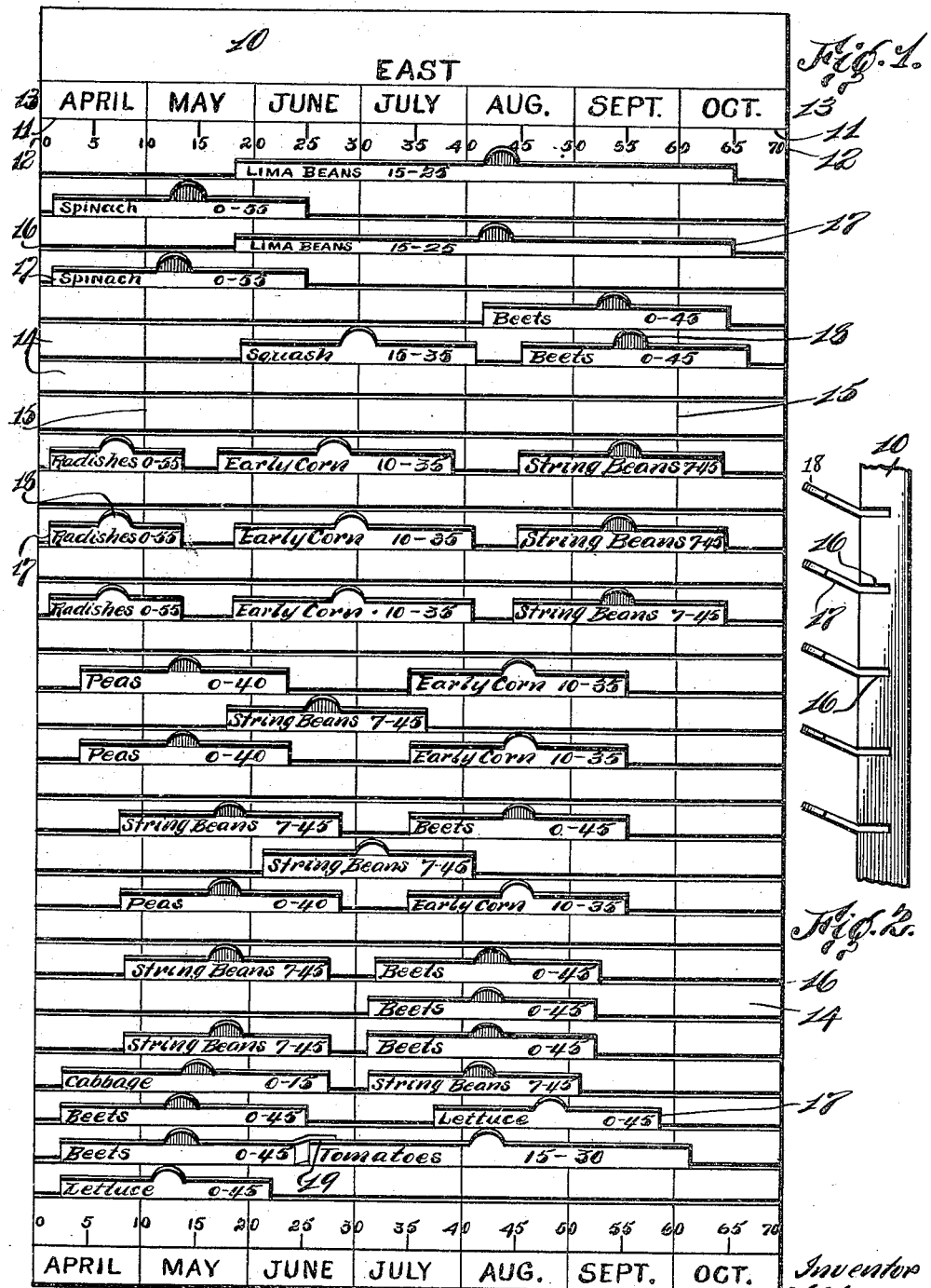

CHARLES H. HODGES, OF NEW YORK, N. Y.

EFFICIENCY-CHART.

1,194,629.  Specification of Letters Patent.  Patented Aug. 15, 1916.

Application filed April 17, 1915. Serial No. 22,182.

*To all whom it may concern:*

Be it known that I, CHARLES H. HODGES, a citizen of the United States, residing at New York, N. Y., have invented certain new and useful Improvements in Efficiency-Charts, of which the following is a clear, full, and exact description.

This invention relates to an efficiency chart which is particularly adapted for gardening, but may be used for other purposes.

One of the objects of the invention is to increase garden efficiency or to enable one to get the largest yield per square foot per season.

Another object of the invention is to provide a sort of education chart which may be used also as a puzzle or game.

Another object of the invention is to provide a chart which, for attaining the desired results, is simple, practical and efficient.

These being among the objects of the invention, the same consists of certain features to be hereinafter described and then claimed with reference to the accompanying drawing illustrating a desirable embodiment thereof and in which—

Figure 1 is a plan view of an efficiency chart for gardening; and Fig. 2 is a side elevation of a portion thereof.

Referring to the drawing, the base 10 may be of any suitable material, dimensions and shape, which will fulfil the ultimate objects of the invention. The said base as shown, represents a field of ground or vegetable garden. At one end of the base 10 there is a scale 11 which is graduated, and the graduations of which represent a progression of units which may be numbered as at 12 so that if each unit covers five degrees, the numbers will run from zero to 70 by multiples of five. Said scale extends along one dimension of said base, and its length under the present invention will be found to stand for the sum of a number of periods of planting of seed to maturity. That is to say, it stands for a span covering the time when a seed may first be planted to the time when the latest growing vegetable reaches maturity, or it stands for successive plantings of the same or different seeds, if vegetables from such seeds shall successively mature within such span or season. Preferably associated with the said scale 11 there is located a parallel monthly calendar 13 running from April to October both inclusive, and a similar scale and monthly calendar may be located at the opposite end of the base 10. Said monthly calendar indicates the maximum time element or the span of the entire season for planting and maturing any seed. It will be noticed that the month of April for instance covers two units of five degrees each on the scale 11, and that the remaining months each cover a corresponding number of units. Extending laterally from said scale, and entirely across the surface of the base if desired, there is a series of parallel columns 14 which are arranged of course in the order of progression of the units of the scale and said columns are preferably defined or separated from each other by lines 15. Each of said columns is of a width corresponding with each month on the calendar, that is to say its width covers two units of the scale 11. The first column to the left will cover the units 0—10 for the month of April, the next column will cover the units 10—20 for the month of May, and so on across the entire width of the so marked surface of the base. Extending across the surface of the base 10 so as to intersect the columns 14, preferably at right angles as shown, there is a series of columns or rows 16, the length thereof corresponding with each other and with the length of the scale 11, and said intersecting columns or rows 16 are preferably equidistantly spaced apart. Each of said columns or rows 16 represents the length of a row of vegetables to be grown and cultivated and also the span of the aforesaid sum of a number of periods of planting of seed to maturity as before elucidated. Under this system or chart it is desirable that each vegetable occupy the entire row represented by each of the columns 16 during its allotted time, although in some cases more than one vegetable may be provided for in a given row.

So far the description has been confined to the system of laying out a diagram of a field of vegetables to be worked upon a chart, but in connection with the described features there is used a number of markers or tags 17. The said markers may be made of cardboard, one edge of which may be caused to engage and be held in position by any one of the columns or rows 16, which in the form of the invention shown, are made up of grooves cut into the laid out surface of the base 10, as is clear from Fig. 2. Of course the object to be accomplished by this engagement is to position the markers or tags 17 at the desired locations. Each marker or tag is preferably provided with a tab or thumb piece 18 whereby it may be handled. Each of the markers 17 will be seen to bear a name of a vegetable, and those bearing the same names are of the same length, but the ones bearing different names are different in length from each other; for instance, the marker bearing the name "Radishes" is shorter than that bearing the name "Early corn." The length of each of the markers represents the length of time from the planting of the seed named on the marker to the maturity of the vegetable grown therefrom in a given row, such seed being planted throughout the entire row usually. For instance, it will be noticed that the length of the marker bearing the word "Radishes" is such as to cover about twelve or thirteen degrees of the scale at a point directly opposite the position of such marker, and as the entire length of the column or row 16 at which said marker is fixed is about five times greater than that of the length of said marker, it will become immediately and visually obvious that different vegetables, providing they are represented by as short or approximately short markers, may be grown successively in a given row throughout the season. The position of any "Radish" marker upon the chart indicates in what period of time the seed named thereon should be planted and when its plant will mature. The same applies to any of the other seeds named on the markers which are provided for use in connection with the chart. But while the position of a marker determines the time for the seed to be planted and to reach maturity, the markers should not be indifferently placed upon the chart. The markers for radishes might be, but early corn and Lima beans should not be. The reason for this becomes clear from the fact that early corn should not be planted as early as radish seeds, nor should Lima beans. In order to determine when a given seed shall be planted and thus determine in a measure the position of the markers for many seeds, each marker is provided with indicia such as the numerals 0—55 for radishes, and the numerals 7—45 for string beans, and these numerals are readable in connection with the units of the scale 11. It will therefore be seen that each marker bears a name of a certain seed and has a length corresponding with a range of units on the scale so as to indicate the period of planting to maturity of the seed whose name it stands for, and that each marker additionally bears indicia readable in connection with the said units on the said scale for ascertaining the planting period for a given seed.

To illustrate the utility of the present invention for indicating whether or not three different kinds of seeds may be planted in a given row of a field represented by one of the transverse columns 16 of the base, one of the rows containing the markers bearing the names "Radishes", "Early corn" and "String beans" on three successive markers may be taken. The "Radish" marker indicates that the radishes will mature at about the unit corresponding with the twelfth or thirteenth degree on the scale, which would be early in May. The "Early corn" marker alined therewith in the same column 16, shows by its length that it takes a little over two months for the maturing of the corn, while the indicia 10—35 thereon indicates that the corn may be planted as soon as the radishes are taken from the ground. The corn would therefore mature some time before the end of July. The marker for "String beans" alined with the said two markers is of less length than the three last months of the season, and consequently its length indicates that string beans may be planted and reach their maturity after radishes and early corn have been successively grown in the same row of a field, but the length is not entirely the determining factor inasmuch as the string beans must be planted in the row before the unit marked 45, which is indicative of the expiration of the time in which string beans may be planted. By referring to the calendar it will be seen that 45 is located at the middle of August. It will not be necessary to give other illustrations, as the same may be deduced from the drawing inasmuch as the names of various seeds are shown thereon. Preferably the color of the tabs 18 of some of the markers differ, and this difference in color as indicated on the drawings means that one seed can advantageously follow another in a given row of a field. It is therefore better to break the colors on the chart, because tabs of the same color in a row indicate that it is not so advantageous to plant the differently named seeds in a given row corresponding therewith. In some cases it is desirable to plant tomatoes between beets before the beets have been pulled out of the ground, in order to get the tomato plants started that much earlier. The possibility of doing this is indicated by lapping the markers at 19 as at the next to the last row 16.

The described efficiency chart as shown, which represents a vegetable garden, has its scale and calender so laid out that the maturity estimates correspond with that for the latitude of the city of New York, being taken from Peter Henderson's *Garden Guide*. The series of units may vary progressively and inversely. For example, the units from April 1st to August 1st may be of gradually increasing length proportionately to the increase of temperature, and from August 1st to October 31st they may be of gradually decreasing length proportionately to the decrease of temperature for the latitude of New York city. The reason for this is that the mean temperature per month, for instance, for that latitude gradually increases until about August 1st and from there on it gradually decreases, vegetation growing faster in the hotter season than in the cooler season. The length of the markers would in such case remain constant.

It is obvious that the present invention has a wide range of application. It may be used in connection with railway service, in a train yard, in which case the end of the chart at which the scale is located will be divided off in such way as to represent the hours and minutes of a complete day, twenty-four hours. The columns or transverse rows 16 will represent the tracks in the yard and the lengths of the markers will indicate the length of time each particular train uses a track. Each marker will bear the name of the train or some other means of identification. The chart may also be used to indicate a shift of workmen in a factory, on construction work, etc. The scale will be divided off into fractions of a day or week, as for instance hours, and the parallel columns 16 will be used to represent different jobs. The length of the markers will indicate by comparison with the scale the working time of a gang of workmen, as for instance nine hours. In all these cases it is obvious that the markers may be used in linear succession, and this would generally be the case in order to lay out the greatest amount of work to be done or object to be accomplished within a given space or time. Another feature of the present invention is that it can be used as a guide to obtain the greatest efficiency from a flower garden. The months of the calendar may be the same as the vegetable garden, the rows or parallel columns 16 will represent the rows of the garden and the markers will indicate the length of time to mature and also the color of the flower so that the colors may be properly blended in a garden.

Obviously the invention is susceptible of modification as parts may be omitted, added and substituted without departing from the spirit and scope of the invention as expressed in the claims, some of which define in general terms a chart which is capable of utilization in manifold ways, instances of which are mentioned herein.

What I claim as new is:—

1. A chart comprising a base having thereon a scale, the graduations of which represent a progression of units, columns extending laterally from said scale in the order of progression of said units, other columns intersecting the aforesaid columns, and, with said scale, representing the entire span of an object to be accomplished, while the first said columns represent fractions of said span, and markers of diverse length associated with said other columns, each marker having a length covering a certain number of said units and indicating a certain fraction of said span in the order of progression of the first said columns.

2. A chart comprising a base having thereon a scale, the graduations of which represent a progression of units, columns extending laterally from said scale in the order of progression of said units, other columns intersecting the aforesaid columns, and, with said scale, representing the entire span of an object to be accomplished, while the first said columns represent fractions of said span, and markers of diverse length associated with said other columns, some at least in linear succession, each marker having a length covering a certain number of said units and provided with a name, and with indicia indicating a certain fraction of said span in the order of progression of the first said columns.

3. A chart comprising a base having a surface representing a field of ground, a scale, the graduations of which represent a progression of units, the length of said scale standing for the sum of a number of periods of planting of seed to maturity, columns extending laterally from said scale across said surface, in the order of progression of said units, and other columns intersecting aforesaid columns, and each representing the span of the sum of said periods, while the first said columns represent fractions of said span, and markers of diverse length associated with said other columns, each marker standing for a certain seed, and having a length standing for the period of planting to maturity of the seed which it stands for.

4. A chart comprising a base having a surface representing a field of ground, a scale, the graduations of which represent a series of units, the length of said scale standing for the sum of a number of periods of planting of seed to maturity, columns extending laterally from said scale across said surface, in the order of said series of units, and other columns intersecting aforesaid columns, and each representing the span of the sum of said periods, while the first said columns represent fractions of said span, and markers of diverse length associated with said other columns, each marker standing for a certain seed, and having a length standing for the period of planting to maturity of the seed which it stands for, and bearing indicia readable in connection with the said units of said scale for ascertaining the period during which its designated seed may be planted.

5. A chart comprising a base having a surface representing a field of ground, a scale, the graduations of which represent a series of units, said units being numbered according to such progression and the length of said scale standing for the sum of a number of periods of planting of seed to maturity, calendric designations for the growing season, associated with said scale, columns defined by lines extending laterally from said scale across said surface, in the order of said series of units, and other columns intersecting aforesaid columns, and each representing the span of the sum of said periods, while the first said columns represent fractions of said span, and shiftable markers of diverse length associated with said other columns, some at least in linear succession, each marker standing for a certain seed, and having a length standing for the period of planting to maturity of the seed which it stands for, and bearing indicia readable in connection with the said units of said scale for ascertaining the period during which its designated seed may be planted.

Signed at New York, N. Y., this 25" day of March 1915.

CHARLES H. HODGES.

Witnesses:
GEO. L. WHEELOCK,
BEATRICE MIRVIS.